United States Patent [19]
Olander

[11] 3,956,242

[45] May 11, 1976

[54] PREPARATION OF POLYPHENYLENE OXIDE USING A MANGANESE (II) ω-HYDROXYOXIME CHELATE REACTION PROMOTER

[75] Inventor: Walter K. Olander, Elnora, N.Y.

[73] Assignee: General Electric Company, Schenectady, N.Y.

[22] Filed: July 24, 1974

[21] Appl. No.: 491,370

[52] U.S. Cl. .................... 260/47 ET; 260/33.8 R
[51] Int. Cl.² ........................................ C08G 65/44
[58] Field of Search ........................... 260/47 ET

[56] References Cited
UNITED STATES PATENTS

| | | | |
|---|---|---|---|
| 3,444,133 | 5/1969 | Behr et al. | 260/47 |
| 3,825,521 | 7/1974 | Izawa et al. | 260/47 |

OTHER PUBLICATIONS

Shono et al., Makromol. Chem., 105, 277–279, (1967).

*Primary Examiner*—Howard E. Schain
*Attorney, Agent, or Firm*—F. Wesley Turner; Joseph T. Cohen; Jerome C. Squillaro

[57] ABSTRACT

A process for the preparation of polyphenylene oxide employing a manganese(II) ω-hydroxyoxime chelate catalyst is described. The process can be effectively carried out both in the absence as well as in the presence of amines. The process is economical and useful in the production of polyphenylene oxide resins.

19 Claims, No Drawings

PREPARATION OF POLYPHENYLENE OXIDE USING A MANGANESE (II) ω-HYDROXYOXIME CHELATE REACTION PROMOTER

This invention relates to a process of forming self-condensation products of a phenol under polymer forming reaction conditions to polyphenylene oxides in the presence of a manganese(II) chelate complex having the formula: $(L)_x Mn$, wherein L is a ligand derived from an ω-hydroxyoxime, Mn is the transition metal manganese(II), and x is a positive integer at least equal to about 0.5. The ligand forming ω-hydroxyoximes can be described by the general formula:

Formula I.

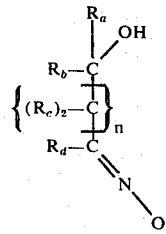

wherein each $R_a$, $R_b$, $R_c$ and $R_d$ is independently selected from the group consisting of hydrogen, acyclic and cyclic organic radicals, and $n$ is a positive integer equal to 0 or 1. In a preferred embodiment the manganese(II) chelate is derived from an ω-hydroxyoxime of Formula I. subject to the proviso that $n$ is the integer 0.

In general, the prior art has determined that first series transition metals such as copper, cobalt, manganese, etc., can be beneficially employed under certain reaction conditions to promote the oxidative coupling of phenols to form polyphenylene oxides (also commonly referred to as polyphenylene ethers). Representative of prior art teachings describing the use of such catalyst systems are U.S. Pat. No.; Hay 3,306,874 and 3,306,875; Bussink 3,337,501; Behr 3,444,133; Kobayashi 3,455,880; Nakashio 3,573,257; Nishioka 3,787,358; Izawa 3,793,246; and Belgium Pat. No. Kanegafuchi 776,044.

Unexpectedly, it has been found that a highly efficient polyphenylene oxide process is provided wherein certain manganese(II) chelates are used to catalyse the rate of polyphenylene oxide formation during the self-condensation of phenols. That the manganese(II) chelate catalyst effect is unexpected is supported by finding that when cobalt(II) is substituted for manganese(II) in the preparation of polyphenylene oxide in an otherwise similar process, the cobalt(II) chelate does not effectively increase the speed of, i.e., catalyze, polyphenylene oxide formation.

In essence, my invention comprises the oxidative coupling of a phenol under polymer forming reaction conditions to produce a polyphenylene oxide wherein the process is carried out in the presence of a manganese(II) chelate complex having the formula: $(L)_x Mn$, wherein L is a ligand derived from an ω-hydroxyoxime, Mn is the transition metal manganese(II), and x is a positive integer at least equal to about 0.5. The ligand forming ω-hydroxyoxime can be selected from the group consisting of the formula:

Formula I.

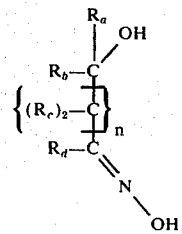

wherein $R_a$, $R_b$, $R_c$, $R_d$ and n are the same as set out hereinbefore.

The manganese(II) chelates can be employed in a mono, bis, tris, tetrakis, etc. ligand form wherein one, two, three, four, etc. bidentate ligands, i.e., bidentate ligand being defined herein as the cyclic ring structure which arises from the union of a manganese(II) atom with a single oxime nitrogen atom and a single hydroxy oxygen atom associated with a single ω-hydroxyoxime ligand forming molecule, are associated with a single Mn(II) atom. Often manganese(II) chelates, preferably, are employed in their bis-bidentate form wherein two cyclic ring structures arise from the union of a single Mn(II) atom with two separate and distinct ω-hydroxyoxime molecules. Illustrative of Mn(II) chelates in mono-bidentate and bis-bidentate form are the chelates described by Formulas II. and III., respectively, set out hereafter.

Formula II.

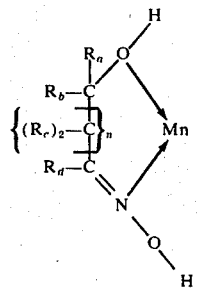

, and
Formula III.

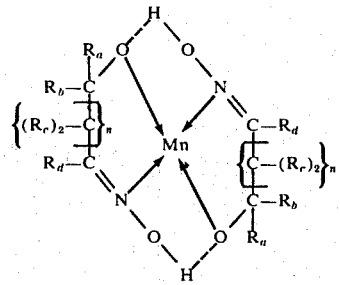

wherein $R_a$, $R_b$, $R_c$, $R_d$ and n are the same as defined hereinbefore.

The manganese(II) chelates can be prepared by any method known to those skilled in the art which introduces a divalent manganese ion, commonly referred to as Mn(II) or as $Mn^{++}$, to a hydroxyoxime ligand group, i.e. any appropriate hydroxyaldoxime or ketoxime of the Formula I, or any mixture thereof. In general, any amount of manganese(II) and ω-hydroxyoxime can be combined in the preparation of the Mn(II) chelate, however, an amount sufficient to form a Mn(II) bis-bidentate ligand chelate ring type is preferably employed. The aforesaid aldoxime or ketoxime reactants can be prepared by any method well-known to those skilled in the art, such as by the well-known reactions of a hydroxylamine with α- or β-hydroxy-substituted aldehyde or ketone, respectively, or by the use of suitable oxime exchange techniques, such as those described in U.S. Pat. No. 3,124,613. In the preparation of the effective Mn(II) chelate, a manganese (II) ion associated with ω-hydroxyoxime donor ligand atoms can be derived from any manganese(II) compound which is at least partially dispersible or soluble in an ω-hydroxyoxime solution. Representative manganese(II) compounds include manganese(II) halides such as manganese(II) chloride (also known as manganous chloride), manganese(II) bromide, manganese(II) iodide, etc., as well as other manganese(II) compounds, such as manganese(II) carbonate, manganese(II) oxalate, manganese(II) sulfate, manganese(II) acetate, manganese(II) nitrate, manganese(II) phosphates, etc., including hydrated forms of such Mn(II) compounds.

A currently preferred method of preparing manganese(II) ω-hydroxyoxime chelates comprises the formation of a solution of a manganese(II) compound and a ligand forming hydroxyoxime molecule in a suitable solvent, such as methanol, chlorobenzene, toluene, and xylene, etc., or mixtures thereof. Although not critical to the formation of an effective Mn(II) chelate reaction catalyst, it is presently preferred after formation of the Mn(II) chelate in solution that an inorganic base be added to the solution in an amount at least sufficient to maintain a weakly basic Mn(II) chelate solution. It is believed, although not wishing to limit this invention by any theory, that the addition of an inorganic base, such as an alkali metal hydroxide or alkoxide to the Mn(II) chelate solution facilitates the possible formation of O...H—O bridges via hydrogen bonding, as illustrated hereinbefore by Formula III. illustrating a Mn(II) bis-bidentate chelate molecule. Dissociation of bridging protons, it is further postulated — at some point in the polymerization of a phenol to a polyphenylene oxide — maybe an important link in the effectiveness of the manganese(II) chelates when employed in the process of this invention. As represented by the structure of Formula III., set out hereinbefore, it appears that the oxygen of the oxime group, $>C=N—OH$, associated with a hydroxyoxime ligand influences not only the properties of its associated oxime nitrogen atom but also influences hydrogen bonding O...H with a bridged hydrogen atom derived from hydroxyl group of another hydroxyoxime ligand.

The possibility of formation of multiple rings, i.e. five- or six-membered chelate rings closely associated with hydrogen bonding is believed — especially with the five-membered chelate rings — to markedly increase the stability and effectiveness of Mn(II) chelates in promoting the condensation of a phenol to a polyphenylene oxide.

The $R_a$, $R_b$, $R_c$ and $R_d$ substituents attached to the chelate ring carbon atoms of the manganese(II) ω-hydroxyoxime catalyst — other than hydrogen — can be any acyclic or cyclic organic radical, e.g. alkyl, cycloalkyl, aryl, aralkyl, alkaryl, alkcycloalkyl, cycloalkaryl radicals or combinations thereof, etc., including acyclic and cyclic radicals having electron-releasing constituents, such as amino, i.e. —$NH_2$; monoalkylamino, i.e. —$NHR^1$, dialkylamino, i.e., —$N(R^1)_2$; hydroxy, i.e. —OH; alkoxy, i.e. —$OR^1$, and alkanoate, i.e. —$OOCR^1$, $R^1$ in all cases being an alkyl group. Preferably, the $R_a$, $R_b$, $R_c$ and $R_d$ substituents associated with each five- or six-membered chelate ring is selected from acyclic and cyclic hydrocarbon radicals, more preferably at least one of the $R_b$ or $R_d$ substituents is selected from aromatic radicals, and even more preferably both of the $R_b$ and $R_d$ substituents are selected from aromatic radicals. Preferably, the acyclic and cyclic hydrocarbon radicals contain from about 1 to about 30 carbon atoms. Representative of preferred hydrocarbon radicals are the following: methyl, ethyl, propyl, butyl, cyclobutyl, pentyl, cyclohexyl, cycloheptyl, decyl, eicosyl, triacontyl, phenyl, benzyl, methylbenzyl, α-methylbenzyl, methylphenyl, diphenylmethyl, naphthylxylyl, etc.

Representative of ω-hydroxyoxime ligand forming molecules that can be employed to prepare the Mn(II) chelates are the following compounds: benzoin oxime, anisoin oxime, paradimethylaminobenzoin oxime, furoin oxime, acetoin oxime, 2-methyl-2-hydroxy-butan-3-one oxime (also known as methylhydroxybutanone oxime), a α-hydroxyacetophenone oxime, 2-methyl2-hydroxy-4-pentanone oxime, 2-phenyl-2-hydroxy-butan-3-one oxime (also known as phenylhydroxybutanone oxime), adipoin oxime, etc.

The process of forming the self-condensation products of phenol in accordance with this invention comprises reacting oxygen with a phenol having the structural formula:
Formula IV.

Formula IV.

where X is a substituent selected from the group consisting of hydrogen, chlorine, bromine, and iodine; R' is a monovalent constituent selected from the group consisting of hydrogen, hydrocarbon radicals, halohydrocarbon radicals having at least 2 carbon atoms between the halogen atoms and phenol nucleus, hydrocarbonoxy radcicals, and halohydrocarbonoxy radicals having at least 2 carbon atoms between the halogen atoms and phenol nucleus, R'' and R''' being the same as R' and, in addition, halogen, wherein the reacting is carried out in the presence of a basic solution of a manganese(II) ω-hydroxyoxime chelate in which the phenol is soluble.

Representative of phenols of Formula IV., among others, which can be employed alone or in admixture are the following: 2,6-dimethylphenol, 2,6-diethylphenol, the 2,6-dipropylphenols, the 2,6-dibutylphenols, 2,6-dilaurylphenol, 2,6-diphenylphenol, 2,6-dimethoxyphenol, 2,3,6-trimethylphenol, 2,3,5,6-tetramethylphenol, 2,6-diethoxyphenol, 2-methoxy-6-ethoxyphenol, 2-ethyl-4-stearyloxyphenol, the 2,6-di(chlorophenoxy)-phenols, 2,6-dimethyl-3-chlorophenol, 2,3-dimethyl-4-chlorophenol, 2,6-dimethyl-3-chloro-5-bromophenol, 2,6-di(chloroethyl)phenol, 2- methyl-6-isobutylphenol, 2-methyl-6-phenylphenol, 2,6-dibenzylphenol, 2,6-ditolylphenol, 2,6-di-(chloropropyl)phenol, 2,6-di-(2',4'-dichlorophenyl)-3-allylphenol, etc. Other specific examples of other phenols of Formula IV. are described in U.S. Pat. No. 3,306,875 and are hereby incorporated herein in their entirety by reference. An especially presently preferred phenol in the practice of this invention is 2,6-dimethylphenol (also known as 2,6-xylenol) because of its extended use in current polyphenylene oxide production.

As indicated hereinbefore, the manganese(II) ω-hydroxyoxime chelate is employed in a phenol soluble solution during self-condensation of a phenol to form a polyphenylene oxide. Any liquid can be employed to form a solution of phenol and Mn(II) chelate, including well known solvents, such as alcohols, ketones, hydrocarbons, chlorohydrocarbons, nitroaromatichydrocarbons, ethers, sulfoxides, etc., subject to the proviso that the solvents do not interfere with the catalyst activity of the Mn(II) chelate in the preparation of the polyphenylene oxide. Since the solvent for the phenol and the Mn(II) chelate does not need to act as a solvent for the polymer, it may be desirable sometimes to use a solvent system, such as toluene, xylene, chlorobenzene, or nitrobenzene or mixtures thereof with methanol as a solvent system in order to cause the polymer to precipitate from the reaction medium while permitting lower molecular weight polymers to remain in solution until they form higher molecular weight polymers. The relative proportions of phenol to solvent can vary widely. Generally, presently acceptable economic reaction parameters comprise a mole proportion of phenol:solvent within the range of from about 20:80 to about 5:95. Presently preferred phenol:solvent mole proportions are within the range of from about 15:85 to about 10:90.

In order to carry out the Mn(II) chelate promoted self-condensation of phenol to polyphenylene oxide the self-condensation reaction must be carried out in a basic reaction medium, such as that provided by the presence of a strong alkali metal base, e.g. alkali metal hydroxides, alkali metal alkoxides, etc., or mixtures thereof. Commercially available alkali metal bases which are readily attainable are presently preferred, such as sodium hydroxide, potassium hydroxide, lithium hydroxide, sodium methoxide, etc. Currently, it is preferred that anhydrous sodium hydroxide be employed to provide the strong basic reaction environment essential to the polymerization reaction, however, aqueous solutions, e.g. 50 percent, sodium hydroxide can be employed for convenience. The quantity of alkali metal base which is essential to the promotion of the self-condensation reaction can readily be determined without undue experimentation by those skilled in the art. In general, however, suitable phenol:alkali metal base mole ratios are within the range of from about 1:1 to 100:1, preferably from about 40:1 to about 5:1, and even more preferably from about 20:1 to about 10:1. In the preparation of polyphenylene oxide from 2,6-xylenol, optimum overall process reaction conditions, generally, establish the desirability of employing a 2,6-xylenol:alkali metal hydroxide mole ratio within the range of from about 14:1 to about 18:1.

In general, the mole proportions of phenol:Mn(II) chelate can vary widely to provide any desired — including minimum, maximum or optimum — degree of promotion of the reaction rate of phenols to polyphenylene oxide. Although not wishing to limit this invention by any theory, it is believed that the Mn(II) chelate reaction promoter functions as a true catalyst which remains essentially unconsumed or unchanged, e.g. a Mn(II) compound which is neither hydrolyzed nor dissociated due to thermal or other effects into a non-catalytic form during the self-condensation process. Apparently, the reason that the Mn(II) chelate behaves as a true catalyst is due to the unexpected stability of the Mn(II) five- or six-membered ω-hydroxyoxime chelate rings during preparation of the polyphenylene oxides.

Advantageously and unexpectedly, it has been found that the Mn(II) chelate catalyst can be employed in very small amounts relative to the amount of phenol reactant while maintaining and often improving the rate of formation of a polyphenylene oxide compared to the rates of polyphenylene oxide formation associated with prior art processes. In general, however, subject to variations in accordance with the type of ω-hydroxyoxime ligand associated with the Mn(II) chelate, reaction rates comparable to those of the prior art can be obtained wherein the phenol to Mn(II) chelate mole ratio is within the range of from as low as about 100:1 to as high as about 3000:1, or even as high as about 6000:1 wherein the reactions are carried out under (a) superatmospheric, or (b) in the presence of certain primary amines, or even as high as about 12,000:1 wherein the reactions are carried out under both (a) superatmospheric pressure and (b) in the presence of certain primary amines.

In general, it is preferred that minimum quantities of Mn(II) chelate be employed in order to avoid the sometimes necessary separation and/or recovery of catalyst residue from the polyphenylene oxide reaction products. Accordingly, it is preferred that the initial reaction media mole ratio of phenol:manganese(II) to be at least about 500:1, more preferably at least 1500:1, and even more preferably at least 3000:1, wherein this process is carried out at (a) atmospheric or subatmospheric pressures and (b) in the absence of certain primary amines.

Both in the specification and the appended claims wherein phenol:manganese(II) numerical ratios are described, it is to be understood that the numerical proportions describe the number of moles of phenol relative to the number of atoms of manganese(II) associated with the Mn(II) chelate independent of the chelate form, i.e., mono-bidentate, bis-bidentate, etc.

In general, the reaction temperature employed in the preparation of polyphenylene oxide in the presence of the Mn(II) chelate catalyst can be varied widely. Suitable polymerization temperatures generally fall within the range of from about 0° to about 50°C., preferably within the range of from about 10° to about 40°C., and more preferably within the range of from about 20° to 30°C. since generally optimum self-condensation reaction rates have been found to exist within the 20° to 30°C. temperature range. Unexpectedly, contrary to many of the Mn(II) chelate catalysts employed in this process, Mn(II) chelates having strong electron-releasing constituents, e.g. dialkylamino radicals attached to $R_a$, $R_b$, $R_c$ or $R_d$ aromatic substituent of Formulas II. or III. promote optimum reaction rates at temperatures at or above 35°C. Because the self-condensation reactions are exothermic in nature and the Mn(II) chelates are susceptible to thermal deactivation, it is generally desirable to program the addition of the phenolic monomeric reactant, and in some instances the Mn(II) chelate catalyst, during their initial contact within the reaction media. This programmed addition permits a suitable reaction temperature profile to be obtained whereby the reaction is maintained within a temperature range suited to optimum catalyst efficiency and optimum yields of polyphenylene oxide resin. In general, more latitude with regard to the upper limits of the reaction temperature range can be obtained wherein the process is carried out at superatmospheric pressures, e.g., 1 to 40 psig, 1 to 1000 psig, or even higher pressures. In the event that the self-condensation reaction is discontinued or interrupted due to deactivation of the Mn(II) chelate at elevated temperatures, the reaction can be resumed in a normal fashion by reducing the temperatures of reaction medium and adding thereto additional manganese(II) chelate catalyst in the amounts required to initiate and maintain the desired catalyst efficiency.

Although certain primary, secondary or tertiary amines, such as those disclosed in U.S. Pat. Nos. 3,306,874, 3,306,875, 3,384,619, 3,639,656 and 3,646,699, etc., have been taught by the prior art as being essential to the catalytic oxidative coupling of phenols carried out in the presence of certain copper-amine complexes in the preparation of polyphenylene oxide, it is unessential that any amine be employed in combination with a Mn(II) chelate catalyst in the preparation of polyphenylene oxide in accordance with the process of this invention.

Quite unexpectedly, it has been found that the use of a primary amine in combination with the Mn(II) chelate catalyst of the process of this invention enhances substantially the rate of self-condensation of phenols in comparison to reaction rates associated with the use of the Mn(II) chelate catalyst in the absence of a primary amine. Because of the improvement in the reaction rates, wherein Mn(II) chelate-amine combinations are used in this invention, the amount of Mn(II) chelate catalyst employed can be substantially reduced - thereby increasing the phenol to Mn(II) chelate ratio - while still maintaining a polyphenylene oxide reaction rate comparable to that found in the absence of a primary amine.

That the above effect of a primary amine is quite unexpected is substantiated by the finding that when a secondary amine - such as those commonly employed in the copper-amine complexes of the aforementioned prior art - is substituted for a rate enhancing primary amine as described in the invention, that the Mn(II) chelate catalyst activity is unaffected or even moderately decreased.

The primary amine classes which can be employed include any primary mono- or polyamine of the following formula:

Formula V.

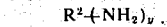

wherein $R^2$ is selected from mono- or polyvalent aliphatic and aromatic radicals, or combinations thereof, $y$ is a positive integer equal to at least 1, subject to the proviso that (a) at least three carbon atoms separate any amino ($-NH_2$) group from any other amino ($-NH_2$) group and (b) at least two carbon atoms separate any amio group ($-NH_2$) from any other nucleophile. As used herein and in the appended claims, the term "any other nucleophile" is intended to describe and include any electron-releasing group selected from the group consisting of monoalkylamino, $-NHR^1$; dialkylamino, $-N(R^1)_2$; hydroxy, $-OH$; alkoxy, $-OR^1$; or alkanoate, $-OOCR^1$ group; $R^1$ in all instances being an alkyl group. More specific descriptions, including examples of individual mono- and polyamines, of Formula V. follow:

methylamine,
ethylamine,
2-hydroxyethylamine,
2-methylaminoethylamine,
n-propylamine,
isopropylamine,
cyclobutylamine,
tertiary butylamine,
cyclobutylamine,
1,4-butanediamine,
4-hydroxybutylamine,
4-ethoxybutylamine,
n-pentylamine,
1,5-pentanediamine,
cyclopentylamine,
n-hexylamine,
4-isopropylcyclohexylamine,
bis(3-aminopropyl)sulfide,
1,4-cyclohexanediamine,
N-methyl-bis(3-aminopropyl)amine,
3-methoxyhexamethylenediamine,
benzylamine,
1,6-hexanediamine,
1,3-xylenediamine - also known as 1,3-bis(aminomethyl)benzene,
1,3-bis(aminomethyl)cyclohexane,
1,2-bis(3-aminopropoxy)ethane,
3-methylheptamethylenediamine,
1,8-octanediamine,
4-isopropyl-1,3-phenylenediamine,
bis(4,4'-aminocyclohexyl)methane,
1,5-diaminonaphthalene,
bis(3,3'-aminophenyl)methane,
bis(4,4'-aminophenyl)methane,
5-hydroxynonamethylenediamine,
4,4'-diaminodiphenylsulfide,
4,4'-diaminodiphenylsulfone,
4,4'-diaminodiphenylether,
3,3'-dimethylbenzidine,
3,3'-dimethoxybenzidine,
4,4'-diaminodiphenylmethane,
bis(p-β-amino-t-butylphenyl)ether,
n-eicosylamine,
1,20-eicosanediamine,
1,30-tricontanediamine, etc.

Preferably, the primary amines are mono- or polyamino substituted aliphatic or aromatic molecules having other than hydrogen, only amino ($-NH_2$) nucleophilic substituents attached to carbon atoms. Particularly preferred amines are polyamino ($-NH_2$) substituted mono- and polycyclic aromatic compounds wherein the amino groups are bonded directly to either an aromatic ring carbon atom or to an aliphatic group that is bonded to an aromatic ring carbon atom. Presently preferred, Type A, and more preferred, Type B, polyamino ($-NH_2$) substituted mono- and polycyclic aromatic compounds can be represented by the following formulas:

| Formula | | Type A | Type B |
|---|---|---|---|
| VI(a). | [benzene ring with (Z)$_p$] | p is ≧ 2 | p is 2 |
| VI(b). | [S-containing 6-ring with (Z)$_p$] | p is ≧ 2 | p is 2 |
| VII(a). | [biphenyl with (Z)$_p$ on each ring] | p is ≧ 1 | p is 1 |
| VII(b). | [bis-S-heterocycle with (Z)$_p$ on each ring] | p is ≧ 1 | p is 1 |
| VIII(a). | [naphthalene with (Z)$_p$ on each ring] | p is ≧ 1 | p is 1 |
| VIII(b). | [bis-S-fused ring with (Z)$_p$ on each ring] | p is ≧ 1 | p is 1 |
| IX(a). | [two benzene rings joined by Y, each with (Z)$_p$] | Y in IX(a) + IX(b) is $C_{1-6}$ alkylene, —O—, —S—, —SO$_2$—, >NR$^3$, wherein R$^3$ is $C_{1-6}$ alkyl radical | Y in IX(a) + IX(b) is the same as in Formula IX(a) and IX(b) Type A |
| IX(b). | [two S-heterocycles joined by Y, each with (Z)$_p$] | | | wherein Formulas VI. through IX., each Z is independently selected from —NH$_2$ and —R$^4$—NH$_2$ radicals, R$^4$ being a $C_{1-6}$ alkylene radical. Specific examples of polyamines of Formulas VI. to IX. compounds include 1,3-bis-(β-aminoethyl)benzene; 1,4-bis(γ-amino-n-hexyl)benzene; 3,3',5,5'-tetraaminobiphenyl; 1,8-bis(β-amino-n-butyl)naphthalene; 1,3-phenylenediamine; 1,4-phenylenediamine; 4,4'-diaminodiphenylpropane; 4,4'-diaminodiphenylmethane (also known as methylenedianiline); benzidine; 4,4'-diaminodiphenylsulfide; 3,3',5,-5'-tetraaminodiphenylsulfone; 4,4'-diaminodiphenylether; 1,5-diaminonaphthalene; etc.

In general, when aliphatic mono- or polyamines are employed, I prefer that the amines be straight chain hydrocarbon groups having from about 1 to about 30 carbon atoms, and more preferably having from about 4 to about 15 carbon atoms. Wherein aromatic amines are used, I prefer that the aromatic amines have from about 7 to about 30 carbon atoms, and more preferably have from about 7 to about 15 carbon atoms.

In general, the amount of amines employed in the practice of this invention can vary widely. Presently preferred mole ratios of phenols:amines are within the range of from about 100:0.05 to about 100:1.5.

In general, it has been found that the use of aliphatic diamines can reduce polyphenylene oxide reaction time by as much as one-half of the reaction time generally found when aliphatic monoamines are employed as Mn(II) chelate rate enhancers, and that the use of aromatic diamines can further reduce the polyphenylene oxide reaction time by as much as one-half of the reaction time generally found when aliphatic diamines are used as the Mn(II) chelate rate enhancers. As will be apparent to those skilled in the art, the variations in both the amounts and types of Mn(II) chelates and primary amines employed in order to acquire any desired degree of reaction rate promotion is essentially unlimited.

In order that those skilled in the art may better understand my invention, the following examples are given which are illustrative of the practice of this invention, however, these examples are not intended to limit the invention in any manner whatsoever. In all the examples, all parts are by weight unless otherwise stated and the following general procedure was employed. For purposes of brevity, only deviations from this procedure will be set out in the examples.

General Procedure

A solution of a phenol, e.g. 2,6-xylenol and a phenol-solvent, e.g. toluene, is divided into approximately two equal parts; a first part being charged to a reactor and another second part being charged to a pump reservoir for the purpose of being added at a generally constant rate to the reactor after initiation of the self-condensation reaction of the phenol to polyphenylene oxide. Stoichiometric amounts, sufficient to form a bis-bidentate chelate, of a Mn(II) compound, e.g. Mn(II) dichloride and a chelate ligand forming molecule, e.g. benzoin oxime, are combined and dissolved in a minimum amount of a Mn(II) chelate-solvent, e.g. methanol. After the Mn(II) chelate-solvent solution is complete, an amount of a phenol-solvent equal to the Mn(II) chelate-solvent is added thereto. A stream of oxygen is introduced into the reactor at ambient temperature at a rate fast enough to provide sufficient oxygen to be in excess over that being absorbed while vigorously stirring the solution. The manganese chelate catalyst solution is then added to the 2,6-xylenol toluene solution. A 50% aqueous sodium hydroxide solution taken up in methanol is added to the reactor in an amount sufficient to provide a 16:1 phenol to $OH^-$ mole ratio during the preparation of the polyphenylene oxide.

After initiation of the polymerization reaction, the reaction is regulated by the rate of addition of the second phenol reactant portion from the pump reservoir to the reactor in order to provide a controllable exotherm so that the temperature does not exceed substantially 45° C., preferably 35° C. When a polyphenylene oxide intrinsic viscosity of about 0.45 as measured in chloroform at 25°C. is obtained, the reaction is stopped by adding to the reactor sufficient aqueous acetic or sulfuric acid to neutralize the reaction media. After neutralization, the entire reaction mixture is precipitated with a suitable solvent, e.g. methanol. The viscosity of the polyphenylene oxide during the polymerization reaction is monitored by correlation of the increase in efflux time of the polymer with a corresponding increase in efflux time of a standard volume of polymer solution in a calibrated pipette. When a primary mono- or polyamine is employed as a rate enhancer for the Mn(II) chelate catalyst, the amine is added to the reaction mixture by combining it with the phenol-solvent portion which is added to the reactor from the monomer pump reservoir.

EXAMPLE I 175 grams of 2,6-xylenol was dissolved in 500 milliliters of toluene and charged to a reactor. The temperature of the 2,6-xylenol toluene solution was raised to 25° C. and an oxygen flow through the reaction media was established at a 6 SCFH. An equal amount of a 2,6-xylenol toluene solution was charged to a pump reservoir. 3.5 grams of di-butylamine (a nonrate enhancing secondary amine) was added to the pump reservoir. A Mn(II) benzoin oxime chelate catalyst was prepared by dissolving 0.2402 grams of Mn(II) chloride and 0.8693 grams of $\alpha$-benzoin oxime in 100 ml. of methanol. An equal volume of toluene, i.e. 100 ml., was added to the Mn(II) chelate-methanol solution and the Mn(II) chelate-methanol-toluene solution was added to the reaction medium. 14.3 grams of a 50% aqueous sodium hydroxide solution taken up in 100 milliliters of methanol was added to the reaction medium. After the addition of catalyst and caustic, reservoir phenol monomer addition to the reactor was initiated and completed in 25 minutes. After 49 minutes, polymerization was quenched with 21 grams of glacial acetic acid in an equal weight of water. The methanol precipitated polymer, prepared during the total reaction time period of 49 minutes had a final intrinsic viscosity of 0.45 in chloroform at 25° C. Polyphenylene oxide having approximately 100 recurring polyphenylene ether units derived from the polymerization of 2,6-xylenol has an intrinsic viscosity of about 0.3 when measured in chloroform at 25° C. A total of 350 grams of 2,6-xylenol, 1810 ml. of toluene, and 328 ml. of methanol were charged to the reactor during the polymerization, i.e. a 15% solids content reaction parameter. The reaction parameter mole ratio of 2,6-xylenol:Mn(II) was 1500:1.

EXAMPLE II 350 grams of 2,6-xylenol, 2645 ml. of toluene, 280 ml. of methanol, 6.5 g. of di-butylamine, 0.2402 g. of Mn(II) chloride, 0.8693 g. of $\alpha$-benzoin oxime, 14.3 g. of 50% aqueous sodium hydroxide was employed in the preparation of polyphenylene oxide. The reactor was pressurized and maintained at 40 psig during the polymerization reaction. The 2,6-xylenol monomer addition was carried out for 15 minutes. After 29 minutes the polymerization was neutralized with acetic acid and methanol precipitated. The precipitated polymer had a final intrinisic viscosity of 0.53 in chloroform at 25°C. The mole ratio of 2,6-xylenol-Mn(II) was 1500:1.

EXAMPLE III 10 grams of 2,6-xylenol, 93.4 ml. of toluene, 11.4 ml. of methanol, 0.1031 g. of Mn(II) chloride, 0.3725 g. of $\alpha$-benzoin oxime, 0.4 g. of 50% aqueous sodium hydroxide were employed in the preparation of polyphenylene oxide in accordance with the general procedure set out hereinbefore. The precipitated polymer, prepared during a reaction time period of 15 minutes, had a final intrinisic viscosity of 1.02 in chloroform at 25°C. The mole ratio of 2,6-xylenol: Mn(II) was 100:1.

This example illustrates that Mn(II) $\omega$-hydroxy oxime chelates effectively promote the self-condensation of a phenol to polyphenylene oxide.

EXAMPLE IV 40 grams of 2,6-xylenol, 205 ml. of toluene, 37.5 ml. of methanol, 0.4218 g. of Co(II) chloride, 1,4862 g. of $\alpha$-benzoin oxime, 1.6 g. of aqueous sodium hydroxide were charged to a reactor in accordance with the general procedure set out hereinbefore. After 1 hour 0.8 g. DBA was added. No polymer was prepared during a 420 minute contact time period at atmospheric pressure and at 25°C. The mole ratio of 2,6-xylenol:Co(II) was 100:1.

This example illustrates that although Co(II), which is reportedly useful in chelate form in combination $CoCl_2$, e.g. note the teachings of Kobayashi, U.S. Pat. No. 3,455,880, as a catalyst from the self-condensation of a phenol to polyphenylene oxide, the combination of Co(II) and a $\omega$-hydroxy oxime does not provide an effective Co(II) chelate catalyst reaction rate promoter for the self-condensation of a phenol to polyphenylene oxide.

EXAMPLE V

A mini-plant polyphenylene oxide run was carried out employing 21.2 kg. of 2,6-xylenol; 110 liters of toluene; 20 liters of methanol; 224.3 g of dibutylamine; 14.57 g. of Mn(II) chloride; 52.65 g. of α-benzoin oxime; and 866.24 g. of a 50% aqueous sodium hydroxide solution. The oxygen flow rate was 200 SCFH in the first hour and then 100 SCFH thereafter. The polymerization reaction was carried at a maximum temperature of about 44°C. (110°F.) during the first 30 minutes of the reaction. The 2,6-xylenol monomer addition was complete in 35 minutes. After two hours, the reaction was quenched by adding 1206 of glacial acetic acid in an equal volume of water. The methanol precipitated polymer, prepared during a total reaction time period of 120 minutes, had a final intrinic viscosity of 0.48 in chloroform at 25° C. The mole ratio of 2,6-xylenol to Mn(II) was 1500:1.

EXAMPLE VI

A series of reactions were carried out in accordance with the general procedure and in accordance with the quantities and reaction ingredients employed in Example I, with the exception that the qualities of Mn(II) chloride and α-benzoin oxime employed in the preparation of the catalyst chelate system were adjusted to provide initial 2,6-xylenol:Mn(II) mole ratios of 1750:1 and 2000:1. The results of varying the ratio of xylenol:Mn(II) are summarized and set out in Table I hereafter in Run Nos. 2 through 5. Run 1 is a recapitulation of the reaction time, the intrinsic viscosity and the 2,6-xylenol:Mn(II) ratio employed in Example I.

TABLE I

| Run No. | Xylenol/Mn Ratio | Time[1] | I.V.[2] |
|---|---|---|---|
| 1 | 1500 | 49 | 0.45 |
| 2 | 1750 | 58 | 0.52 |
| 3 | 1750 | 60 | 0.48 |
| 4 | 1750 | 60 | 0.49 |
| 5 | 2000 | 77 | 0.52 |

[1]Reported in minutes
[2]Measured in chloroform at 25° C. (dl./g.)

This example illustrates that the effectiveness of a Mn(II) ω-hydroxy oxime chelate can be readily determined by varying the mole ratio of phenol to Mn(II) chelate catalyst in a polyphenylene oxide process by means of a simple correlation between reaction time and polymer intrinsic viscosity.

EXAMPLE VII

A series of oxidative coupling reaction were carried out in accordance with the general procedure employing the same reaction media ingredients as employed in Example I except for the use of different ω-hydroxy oxime ligand forming molecules in the preparation of the Mn(II) chelate catalyst. Tabulated hereafter by run numbers 1 through 10 are the reaction results identifying the ω-hydroxy oxime ligand forming molecule, the xylenol:Mn(II) mole ratio, the total reaction time, and the resulting polyphenylene oxide intrinsic viscosities.

TABLE I

| Run No. | Ligand Forming ω-Hydroxy Oxime | Formula | Xylenol Mn(II) Ratio | Time (1) | I.V. (2) |
|---|---|---|---|---|---|
| 1. | furoin oxime | | 1500:1 | 160 | low polymer ~0.2 |
| 2. | acetoin oxime | | 100:1 | 144 | 0.438 |
| 3. | α-hydroxy-acetophenone oxime | | 100:1 | 70 | 0.718 |
| 4. | 2-methyl-2-hydroxy-4-pentanone oxime | | 100:1 | 200 | 0.578 |
| 5. | methylhydroxybutanone oxime | | 250:1 | 60 | 0.45 |

TABLE I-continued

| Run No. | Ligand Forming ω-Hydroxy Oxime | Formula | Xylenol Mn(II) Ratio | Time (1) | I.V. (2) |
|---|---|---|---|---|---|
| 6. | anisoin oxime | (structure: bis(4-methoxyphenyl) with C=NOH and CH-OH) | 1500:1 | 56 | 0.497 |
| 7. | benzoin oxime | (structure: diphenyl with C=NOH and CH-OH) | 1500:1 | 40 | 0.59 |
| 8. | p-dimethylaminobenzoin oxime | (structure: p-(CH$_3$)$_2$N-phenyl and phenyl with C=NOH and CH-OH) | 2000:1 | 83 | 0.473 |
| 9. | phenylhydroxybutanone oxime | (structure: CH$_3$-C(=NOH)-C(OH)(CH$_3$)-phenyl) | 2500:1 | 90 | 0.447 |

The above runs illustrate the effectiveness of various Mn(II) ω-hydroxyoxime chelates as catalysts in the preparation of polyphenylene oxide.

EXAMPLE VIII

A series of oxidative coupling reactions were carried out at various xylenol:Mn(II) mole ratios out in accordance with the general procedure. The same reaction ingredients were employed as in example I except that primary and secondary amines other than dibutylamine were employed in order to evaluate any effects upon the reaction rate which might be associated with the use of primary amines in the Mn(II) chelate catalyzed process. In each series of runs having similar xylenol:Mn(II) ratios, e.g. 1500:1, 1750:1, etc., at least one run was carried employing dibutylamine as the control amine test additive.

TABLE I

| Run No. | Xylenol Mn(II) Mole Ratio | Amine[1] | Xylenol Amine Mole Ratio | % Solids | PMAT (2) | ΣTime (3) | I.V. (4) |
|---|---|---|---|---|---|---|---|
| 1. | 1500 | dimethylamine (S) | 57.6 | 16 | 21.5 | 55 | 0.69 |
| 2. | 1500 | dibutylamine (S) | 105.7 | 16 | 25 | 49.0 | 0.45 |
| 3. | 1500 | ethanolamine (P) | 106.3 | 16 | 25 | 41 | 0.53 |
| 4. | 1750 | morpholine (S) | 58.1 | 16 | 21 | 46.0 | 0.39 |
| 5. | 1750 | dibutylamine (S) | 105.7 | 16 | 25 | 58–60 | 0.48–0.52 |
| 6. | 1750 | dibenzylamine (S) | 62.8 | 16 | 20 | 46.5 | 0.40 |
| 7. | 2000 | dimethylamine (S) | 57.6 | 16 | 24 | 71 | 0.46 |
| 8. | 2000 | dibutylamine(S) | 105.7 | 16 | 25 | 77 | 0.52 |

TABLE I-continued

| Run No. | Xylenol Mn(II) Mole Ratio | Amine[1] | Xylenol Amine Mole Ratio | % Solids | PMAT (2) | ΣTime (3) | I.V. (4) |
|---|---|---|---|---|---|---|---|
| 9. | 2000 | 1,4-butanediamine (P) | 105.0 | 16 | 23 | 37 | 0.515 |
| 10. | 2000 | n-hexylamine (P) | 96.6 | 16 | 25 | 43 | 0.45 |
| 11. | 2000 | n-octylamine (P) | 105.7 | 16 | 28 | 45.2 | 0.52 |
| 12. | 3000 | 1,8-octenediamine (P) | 118.1 | 16 | 29 | 55.6 | 0.47 |

(1) P=primary, S=secondary
(2) Program Monomer Addition Time in Minutes
(3) Total Reaction Time Including Program Monomer Addition Time
(4) Intrinsic Viscosity in Chloroform at 25° C.

The above data illustrates that primary aliphatic mono- and polyamines enhance the Mn(II) chelate promotion of the rate of self-condensation of phenols to polyphenylene oxide.

EXAMPLE IX

A series of six 2,6-xylenol oxidative coupling reactions were carried out in accordance with the general procedure employing the same reaction media ingredients used in Example I except that the solids content was 12% rather than 16%. Three of the six reactions were carried out under 40 psi oxygen pressure in order to determine the combined effect of oxygen pressure and Mn(II) chelate catalyst upon the rate of reaction. The results of the tests are set out in the following Table I:

TABLE I

| Run No. | Xylenol Mn(II) Mole Ratio | Amine[1] | Xylenol Amine Mole Ratio | Reaction Pressure (psig) | PMAT (2) | ΣTime (3) | I.V. (4) |
|---|---|---|---|---|---|---|---|
| 1. | 1500 | dibutylamine | 56.9 | 40 psi | 14.5 | 29.5 | 0.53 |
| 2. | 1500 | dibutylamine | 56.9 | 40 psi | 14.5 | 29.5 | 0.47 |
| 3. | 1500 | dibutylamine | 56.9 | 40 psi | 16.0 | 33 | 0.45 |
| 4. | 1500 | dibutylamine | 56.9 | Atmos. | 24.5 | 51 | 0.51 |

(1), (2), (3) & (4) as defined in Example VIII

The above data illustrates the reaction time required to obtain the reaction rate benefits associated with the use of Mn(II) chelate catalysts in the practice of this invention is decreased wherein the polymerization is carried out in the presence of oxygen at superatmospheric pressures.

EXAMPLE X

A series of oxidative coupling reactions were carried out at various xylenol:Mn(II) mole ratios in accordance with the general procedure. The same reaction ingredients were employed as in Example I except that primary diamines were employed rather than secondary dibutylamine which was employed in Example I. The primary diamines were evaluated in order to determine the effect, if any, upon reaction rate which might be associated with the use of primary diamines in Mn(II) chelate catalyzed polyphenylene oxide process reaction.

TABLE I

| Run No. | Xylenol Mn(II) Mole Ratio | Amine (1) | Xylenol Amine Mole Ratio | Solids | PMAT (2) | Σ Time (3) | I.V. (4) |
|---|---|---|---|---|---|---|---|
| 1. | 1500/1 | MDA | 100 | 16 | 25.5 | 48 | 0.896 |
| 2. | 1500/1 | MXDA | 100 | 16 | 24.1 | 26 | Gel, Insol |
| 3. | 2000/1 | MXDA | 223.3 | 16 | 25.5 | 30 | 0.487 |
| 4. | 2500/1 | MXDA | 223.3 | 16 | 24 | 27.7 | 0.523 |
| 5. | 4000/1 | MXDA | 111.5 | 16 | 26 | 41.5 | 0.61 |
| 6. | 5000/1 | MXDA | 111.5 | 16 | 25 | 52 | 0.56 |
| 7. | 5500/1 | MXDA | 111.5 | 16 | 25.7 | 114 | 0.412 |
| 8. | 6000/1 | MXDA | 111.5 | 16 | 26.9 | 120 | 0.531 |
| 9. | 2500/1 | BAC | 229.6 | 16 | 26.0 | 51 | 0.53 |
| 10. | 3000/1 | MXDA | 447.9 | 16 | 27.3 | 70 | 0.536 |
| 11. | 4000/1 | MXDA | 223.3 | 16 | 26.6 | 67.8 | 0.51 |
| 12. | 5000/1 | MXDA | 111.5 | 16 | 41.6 | 140 | 0.544 |

MDA - methylenediamine (also known as 4,4'-diaminodiphenylmethane)
MXDA - 1,3-bis(aminomethyl)benzene
BAC - 1,3-bis(aminomethyl)cyclohexane
(1), (2), (3) & (4) same as defined in Example VIII The above data illustrates that the reaction time required to obtain the reaction rate benefits associated with the use of Mn(II) chelate catalyst in the practice of this invention is decreased even more significantly when a primary diamine is employed as a rate enhancing amine rather than a primary monoamine.

From the foregoing examples, it will be apparent that the choice of Mn(II) ω-hydroxyoxime chelate catalyst, primary amine and reaction pressure determine to a great extent the efficacy of Mn(II) chelates as oxidative coupling catalysts in the self-condensation of phenol to polyphenylene oxide. The Examples also illustrate the unexpected catalyst activity associated with Mn(II) chelate catalyst systems of this invention.

The polyphenylene oxide resins prepared by the process of this invention are suited because of their excellent physical, mechanical, chemical and film properties in a similar manner to polyphenylene oxide resins prepared by other methods well-known to those skilled in the art — including U.S. Pat. No. 3,306,875 — to a wide and varied variety of uses. For example, they can be used in molding powder formulations where they can be molded, calendered, or extruded as films, coatings, threads, filaments, tapes and the like. The polymers may also be combined with various fillers, modifying agents, etc., such a dies, pigments, stabilizers, plasticizers, etc.

Other modifications and variations of the present invention are possible in light of the above teachings. It is, therefore, to be understood that changes may be made in the particular embodiments of the invention described which are within the full intended scope of the invention as defined by the appended claims.

What I claim as new and desire to secure by Letters Patent in the United States is:

1. A process of forming self-condensation products of a phenol having the structural formula:

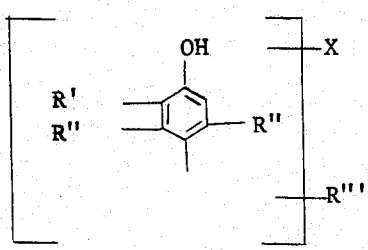

where X is a substituent selected from the group consisting of hydrogen, chlorine, bromine, and iodine; R' is a monovalent constituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atoms and phenol nucleus, R'' and R''' being the same as R' and, in addition, halogen under reaction conditions which comprise contacting said phenol with oxygen in a basic reaction medium and in the presence of a manganese chelate complex of the formula:

$(L)_x Mn$ , wherein L is an ω-hydroxyoxime ligand of the formula:

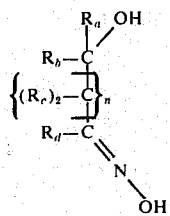

wherein independently each $R_a$, $R_b$, $R_c$ and $R_d$ is selected from the group consisting of hydrogen, acyclic and cyclic hydrocarbon radicals, and $n$ is a positive integer equal to 0 or 1, and $x$ is a positive number at least equal to about 1.0.

2. The process of claim 1, wherein independently $R_a$, $R_b$, $R_c$ and $R_d$ is selected from the group consisting of hydrogen, acyclic and cyclic hydrocarbon radicals, or acyclic and cyclic hydrocarbon radicals having electron-releasing constituents selected from the class consisting of $-NH_2$, $-NHR^1$, $-N(R^1)_2$, $-OH$, $-OR^1$, and $-OOCR^1$, wherein $R^1$ is an alkyl group.

3. The process of claim 2, wherein independently each acyclic and cyclic hydrocarbon radical contains from about 1 to about 30 carbon atoms.

4. The process of claim 3, wherein independently at least one of $R_b$ and $R_d$ is an aromatic radical.

5. The process of claim 1, wherein said phenol is 2,6-dimethyl phenol and $n$ is equal to 0.

6. The process of claim 1, wherein each $R_b$ and $R_d$ substituent is an aromatic radical.

7. The process of claim 1, wherein said contacting is carried out in the presence of a primary amine.

8. The process of claim 7, wherein said primary amine is of the formula:

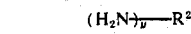

wherein $R^2$ is selected from mono- and polyvalent aliphatic and aromatic radicals, $y$ is a positive integer at least equal to 1, subject to the proviso that (a) at least three carbon atoms separate any $+NH_2$) group from any other amino $+NH_2$) group, and (b) at least two carbon atoms separate any amino group $+NH_2$) from any other nucleophile.

9. The process of claim 9, wherein $y$ is at least equal to about 2.

10. The process of claim 9, wherein the amine is selected from the group consisting of polyamino subtituted mono- and polycyclic aliphatic and aromatic compounds.

11. The process of claim 1, wherein said contacting is carried out in the presence of an alkali metal base.

12. The process of claim 1, wherein said contacting is carried out at a temperature within the range of from about 0° to about 50°C.

13. The process of claim 12, wherein the range is from about 20° to about 30°C.

14. The process of claim 1, wherein said contacting is carried out at superatmospheric oxygen pressure.

15. The process of claim 1, wherein said ω-hydroxyoxime is benzoin oxime.

16. The process of claim 1, wherein said ω-hydroxyoxime is anisoin oxime.

17. The process of claim 1, wherein said ω-hydroxyoxime is p-dimethylaminobenzoin oxime.

18. The process of claim 1, wherein said ω-hydroxyoxime is 2-phenyl-2-hydroxy-butan-3-one.

19. The process of claim 1, wherein $x$ is a positive number at least equal to about 2.

* * * * *